(12) United States Patent
Jeong

(10) Patent No.: US 8,698,937 B2
(45) Date of Patent: Apr. 15, 2014

(54) TERMINAL AND IMAGE CAPTURING METHOD THEREOF

(75) Inventor: Moon Sang Jeong, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 977 days.

(21) Appl. No.: 12/121,715

(22) Filed: May 15, 2008

(65) Prior Publication Data

US 2008/0297617 A1    Dec. 4, 2008

(30) Foreign Application Priority Data

Jun. 1, 2007    (KR) .................. 10-2007-0053674

(51) Int. Cl.
*H04N 5/222*    (2006.01)

(52) U.S. Cl.
USPC ............ 348/333.03; 348/333.02; 348/333.11; 348/239; 348/207.99

(58) Field of Classification Search
None
See application file for complete search history.

(56) References Cited

U.S. PATENT DOCUMENTS

| | | | |
|---|---|---|---|
| 2004/0100572 A1* | 5/2004 | Kim .................. | 348/333.01 |
| 2005/0088542 A1* | 4/2005 | Stavely et al. ............ | 348/239 |
| 2006/0204110 A1* | 9/2006 | Steinberg et al. ........... | 382/224 |
| 2007/0002157 A1 | 1/2007 | Shintani et al. | |
| 2008/0266419 A1* | 10/2008 | Drimbarean et al. ...... | 348/229.1 |

FOREIGN PATENT DOCUMENTS

| | | | |
|---|---|---|---|
| JP | 2000-321652 A | 11/2000 | |
| JP | 2001-116985 A | 4/2001 | |
| JP | 2006-319470 A | 11/2006 | |
| JP | 2007-027971 A | 2/2007 | |
| KR | 10-0503039 B1 | 7/2005 | |
| KR | 10-0565269 B1 | 3/2006 | |
| KR | 10-0565318 B1 | 3/2006 | |
| KR | 10-2006-0037910 A | 5/2006 | |

* cited by examiner

*Primary Examiner* — Twyler Haskins
*Assistant Examiner* — Angel L Garces-Rivera
(74) *Attorney, Agent, or Firm* — Jefferson IP Law, LLP

(57) ABSTRACT

A terminal with an image capture function and an image capturing method thereof are provided that can display a capture guide on a preview screen and optimize the arrangement of persons in a photographic image. The image capturing method of a terminal includes recognizing a face in an image displayed on a preview screen in a capture mode, overlaying a capture guide on the preview screen according to the recognized face, and capturing the image when the image is arranged to substantially correspond to the capture guide. The terminal and the image capturing method can capture an image to overlay a capture guide according to a recognized face on a preview screen. Also, the terminal and the image capturing method can capture an image to select a capture guide and overlay the particular capture guide on the preview screen during the capture mode. Furthermore, the terminal and the image capturing method can edit saved images according to a capture guide. Therefore, an image can be optimized where persons are properly arranged and convenience of the terminal is improved.

12 Claims, 8 Drawing Sheets

TERMINAL AND IMAGE CAPTURING METHOD THEREOF

PRIORITY

This application claims the benefit under 35 U.S.C. §119 (a) of a Korean patent application filed in the Korean Intellectual Property Office on Jun. 1, 2007 and assigned Serial No. 2007-0053674, the entire disclosure of which is hereby incorporated by reference.

BACKGROUND OF THE INVENTION

1. Field of the Invention

The present invention relates to image capturing technology. More particularly, the present invention relates to a terminal with an image capture function and an image capturing method thereof that can display a capture guide on a preview screen and optimize the arrangement of persons in a photographic image.

2. Description of the Related Art

In recent years, as increasingly smaller and lighter electronic parts are manufactured, terminals employing those electronic parts, such as mobile communication terminals, etc., have accordingly decreased in size. Also, due to consumer demand, terminals have been developed that are equipped with a variety of functions, such as a camera function, in addition to a voice call function. Recently, terminals including a camera have been developed and sold on the market.

Users often take photographs of persons using the camera equipped in such a terminal. However, these photographs may be of poor quality, especially concerning the placement of persons within the photographic image, due to the users' lack of photographic skill. In order to address these problems, users refer to guide books on how to capture an image of a person. However, users still have difficulty applying directions included in the guidebooks to an actual image capturing situation.

SUMMARY OF THE INVENTION

An aspect of the present invention to address at least the above-mentioned problems and/or disadvantages and to provide at least the advantages described below. Accordingly, an aspect of the present invention is to provide a terminal with an image capture function and an image capturing method thereof that can facilitate the capturing of images of persons by overlaying a capture guide on the preview screen of the terminal.

An aspect of the present invention further provides a terminal with an image capture function and an image capturing method thereof that can easily facilitate the arrangement of persons and the capture of images of the persons according to a capture guide selected in a capture mode.

An aspect of the present invention further provides a terminal with an image capture function and an image capturing method thereof that can select saved images, and edit the selected images according to a particular capture guide.

In accordance with an exemplary embodiment of the present invention, an image capturing method of a terminal is provided. The method includes recognizing a face in an image displayed on a preview screen in a capture mode; overlaying a capture guide on the preview screen according to the recognized face; and capturing the image when the image is arranged to substantially correspond to the capture guide.

In accordance with another exemplary embodiment of the present invention, an image capturing method of a terminal is provided. The method includes selecting a capture guide provided in an image capture mode, according to at least one of a pose, an arrangement, and a number of persons to be captured, overlaying the selected capture guide on a preview screen, and capturing the image, when an image is substantially arranged according to the capture guide.

In accordance with another exemplary embodiment of the present invention, an image capturing method of a terminal is provided. The method includes determining, when saved images are selected, whether a capture guide is selected, recognizing, when the capture guide is selected, a face in the selected image, overlaying the capture guide on the image according to the recognized face, and editing the image.

In accordance with another exemplary embodiment of the present invention, a terminal is provided. The terminal includes a camera for capturing an image, a face recognition unit for recognizing one or a plurality of faces in the image, a memory for storing the image and a capture guide according to the recognized face, and a controller for overlaying the capture guide on a preview screen on which the image is displayed, and for capturing an image when the image is arranged to substantially correspond to the capture guide.

Preferably, the capture guide includes template types of information about the number, position, pose, size, etc., of persons to be captured. The capture guide may include similar capture guides that provide a plurality of selections allowing for different positions and poses, etc. regarding the same number of persons. One of a plurality of similar capture guides can be provided as a capture guide displayed during the capturing. Similar capture guides can be displayed and selected according to a user's input. For example, when the same number and position regarding a person is determined, a capture guide is provided to allow for selection of different poses. Also, when the same number of the persons is determined, a capture guide for a particular position can be selected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Although a terminal according to exemplary embodiments of the present invention is described based on a terminal with a camera, it will be appreciated that the terminal can be applied to all information communication devices, multimedia devices, and their applications, such as a mobile communication terminal, a portal phone, wired/wireless phones, a personal digital assistant (PDA) terminal, a smart phone, an MP3 player, a laptop computer, a personal computer, and the like.

Exemplary Embodiment 1

Figure 1:
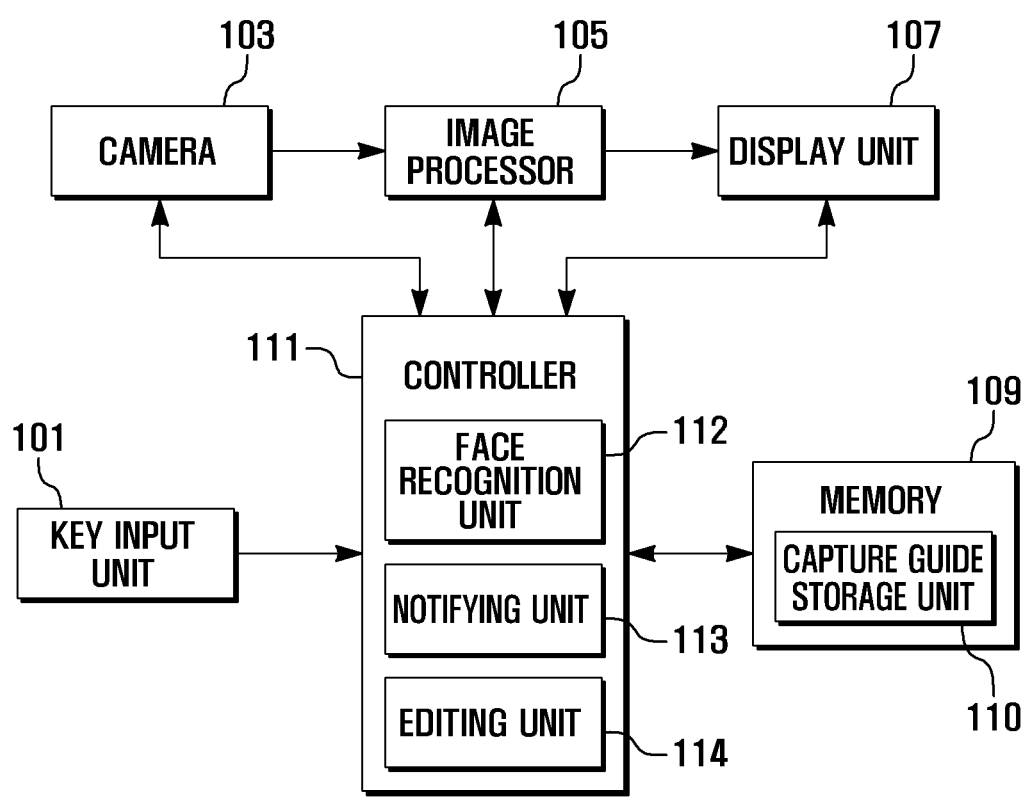
FIG. 1 is a schematic block diagram illustrating a terminal with an image capture function, according to an exemplary embodiment of the present invention.

FIG. 1 is a schematic block diagram illustrating a terminal with an image capture function, according to a first exemplary embodiment of the present invention.

Referring to FIG. 1, the terminal includes a key input unit 101, camera 103, image processor 105, display unit 107, memory 109, and controller 111.

The key input unit 101 receives input from a user for controlling the operation of the terminal. The key input unit 101 may be operated to drive the camera 103, select image capture modes, capture and save images, select a capture guide, or the like.

The camera 103 captures a subject and generates image signals. The camera 103 is configured to include a camera sensor for converting an optical signal corresponding to a captured image into an electrical signal (i.e., an analog image signal), and a signal processor for converting the analog image signal of the camera sensor into a digital signal. The camera 103 may capture an image including a person.

The image processor 105 generates screen data for displaying image data output from the camera 103. The image processor 105 includes an image codec that compresses image data displayed on the display unit 107 according to a preset method or decompresses the compressed image data to the original image data.

The display unit 107 displays a variety of information related to the state and operation of the terminal. The display unit 107 displays images captured through the camera 103. The display unit 107 displays an image on the preview screen, overlaying a capture guide thereon. When a person to be photographed is arranged to be displayed on the preview screen, the display unit 107 may also display a pop-up window through which a notifying unit 113 indicates that the person is properly arranged.

The memory 109 stores programs and information necessary for the operation of the terminal. The memory 109 includes a capture guide storage unit 110 that stores a plurality of capture guides based on a template type. The capture guide storage unit 110 stores various types of capture guides according to a number of faces, size of the faces, coordinates of the features in the faces, coordinates of the pupils, angle of the faces, coordinates of bodies, etc., which can be recognized in one image.

The controller 111 controls operations of the various components in the terminal. The controller 111 can control an image capture function according to an exemplary embodiment of the present invention. The controller 111 may control a preview screen to be displayed on the display unit 107 in the image capture mode. The controller 111 includes a face recognition unit 112 for recognizing a face in the image displayed on the preview screen. The face recognition unit 112, when recognizing a face in the image displayed on the preview screen, determines whether a face is there and recognizes the number of faces.

When a single face is included in the image, the face recognition unit 112 detects the person's outline in the screen, and recognizes whether the face, whole body or upper body is included in the screen. When a singe face is included in an image, the face recognition unit 112 detects the coordinates of the features in the face, coordinates of pupils, angle of the face, and coordinates of the person. That is, the face recognition unit 112 detects the coordinates of eyes, nose, and mouth in the face, coordinates of pupils in the eyes, angle of the face, and coordinates of the face displayed in the screen. It should be understood that the present invention is not limited by the coordinates listed above and instead can be implemented by other types of coordinates. When substantially a whole body is included in an image, the face recognition unit 112 detects the coordinates of the person rather than the face, i.e., only a position of a person displayed in the screen, because the face recognition unit 112 has difficulty detecting detailed portions in an image that includes the whole body. It should be noted that the face recognition unit 112 could recognize other portions of a body in addition to faces. When a face and upper body are included in an image, the face recognition unit 112 detects the coordinates of the features in the face, angle of the face, and coordinates of the body. That is, the face recognition unit 112 can not recognize as much detailed information in an image that includes the upper body than an image that includes only a face, but can recognize more detailed information in the image that includes the upper body than an image that includes a whole body. It should be understood that the face recognition unit 112 is not restricted to the recognition of the attributes described above and that the attributes described above are merely an example of recognizable attributes.

When a plurality of faces appears in an image, the face recognition unit 112 recognizes whether a face greater than a preset size is included. When a face greater than a preset size is in an image, the face recognition unit 112 detects the coordinates of the features in the face, the coordinates of pupils, angle of the face, coordinate of the person, and coordinates of persons of the other faces.

The controller 111 displays a capture guide on a preview screen on which an image is displayed according to the face recognized through the face recognition unit 112. When the controller 111 recognizes that persons are properly arranged in the image according to the capture guide, it automatically captures images. Also, the controller 111 can include a notifying unit 113. Here, when the controller 111 recognizes that persons are properly arranged in the image according to the capture guide, it allows the notifying unit 113 to notify the user. For example, the notifying unit 113 displays a pop-up window on the display unit 107, turns on/off lighting devices, such as an LED, or generates a one or more sounds. An exemplary embodiment is configured in such a way that the controller 111 includes an editing unit 114 as shown in FIG. 1, however, in another exemplary embodiment the editing unit 114 may be omitted. The editing unit 114 will be described in detail below.

The terminal of an exemplary embodiment of the present invention may further include a radio frequency (RF) unit for performing wireless communications. The RF unit is configured to include an RF transmitter for up-converting the frequency of transmitted signals and amplifying the signals to be transmitted. The RF unit is also configured to include an RF receiver for low-noise amplifying received RF signals and down-converting the frequency of the received RF signals.

Figure 2:
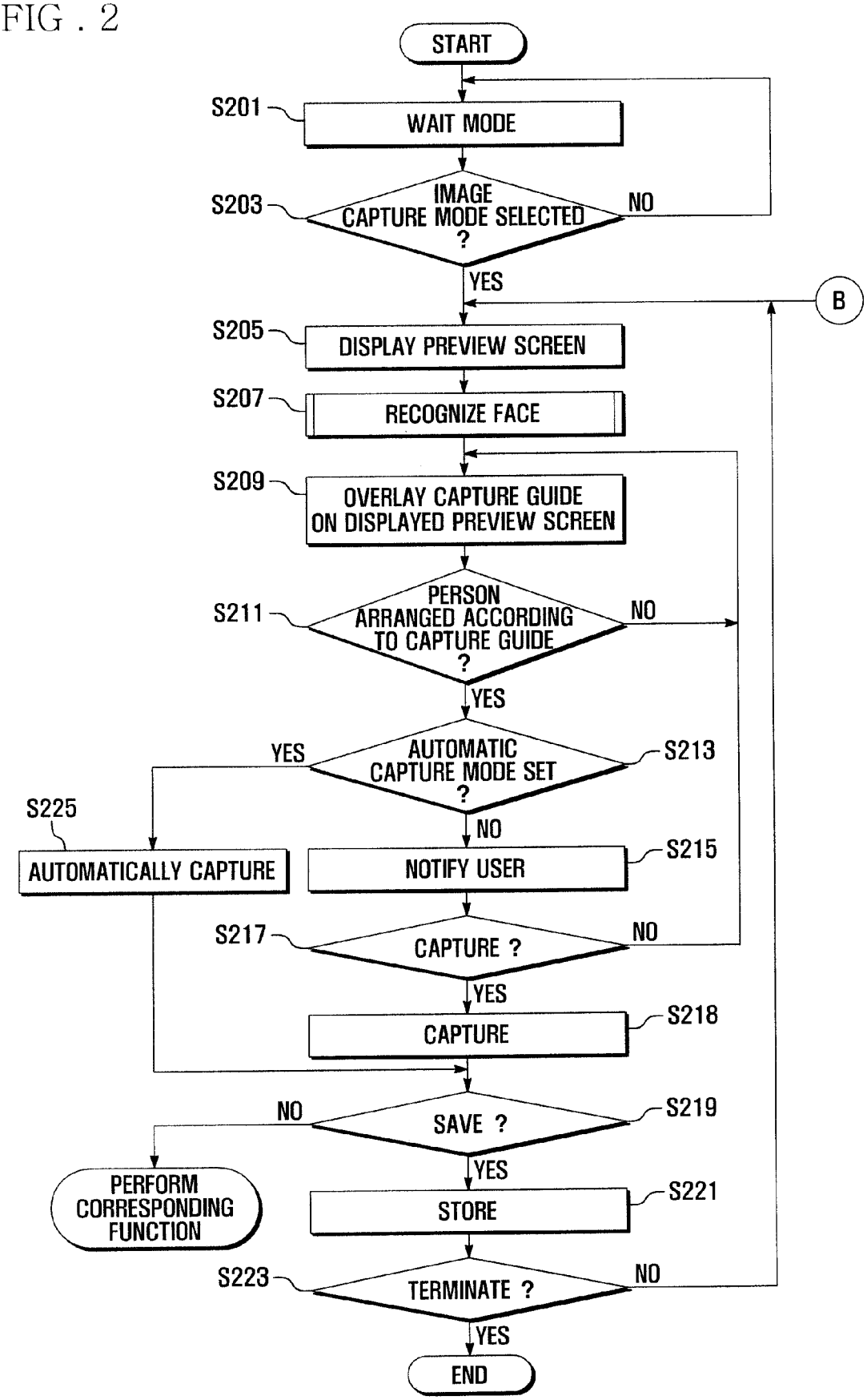
FIG. 2 is a flowchart illustrating an image capturing method according to a first exemplary embodiment of the present invention.
Figure 3A:
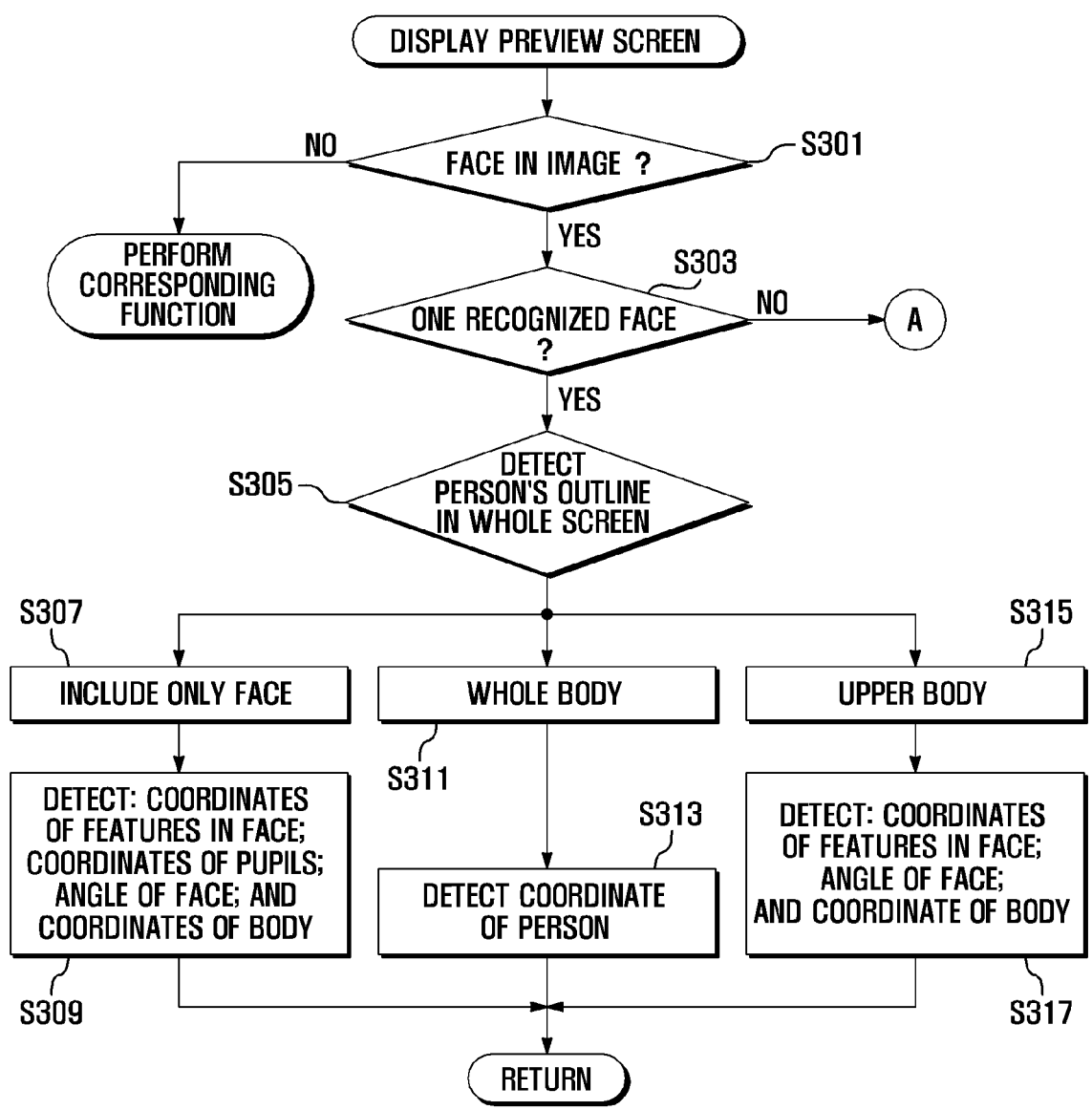
FIG. 3A and FIG. 3B are flowcharts illustrating, in detail, a face recognition process of FIG. 2 according to an exemplary embodiment of the present invention.
Figure 3B:
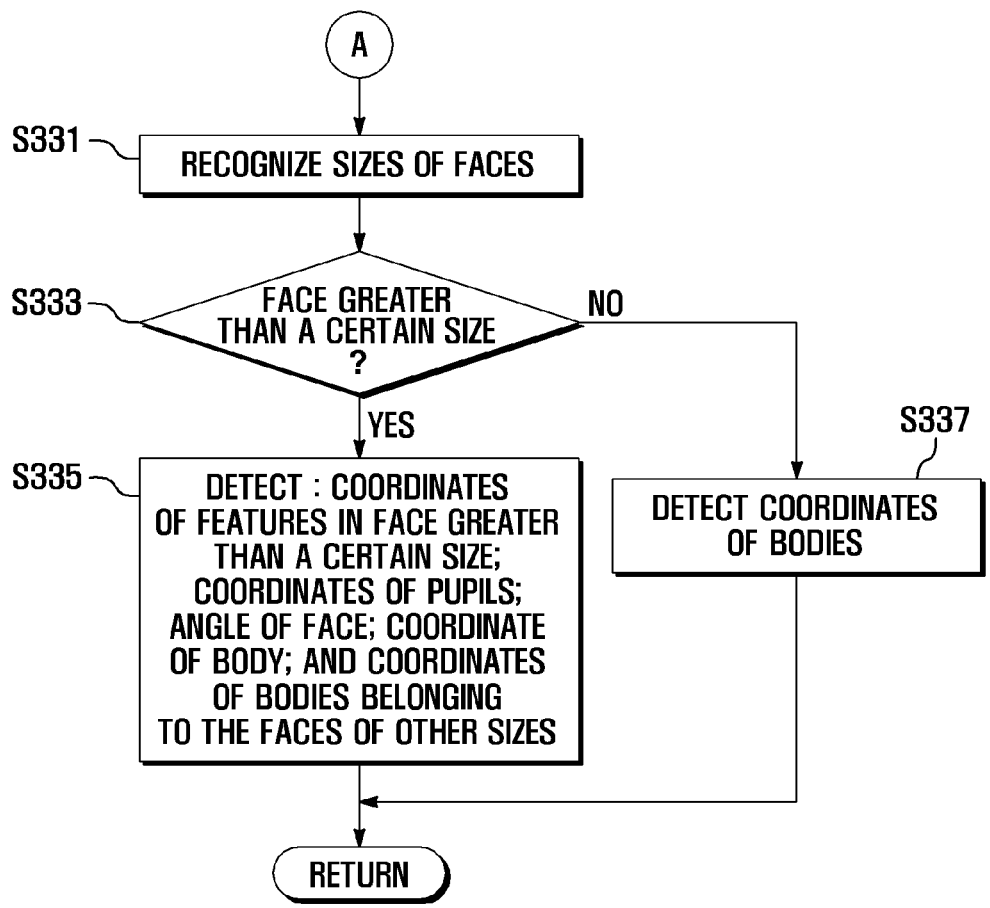

In the following description, the image capturing method of the terminal, according to an exemplary embodiment of the present invention, will be describing with reference to FIG. 2, FIG. 3A, FIG. 3B and FIG. 4A to FIG. 4E. FIG. 2 is a flowchart illustrating a first exemplary embodiment of an image capturing method according to the present invention. FIG. 3A and FIG. 3B are flowcharts illustrating, in detail, a face recognition process of FIG. 2. FIG. 4A to FIG. 4E are views illustrating screens of a terminal with an image capture function.

First, as shown in FIG. 2, the controller 111 recognizes a wait mode in step S201.

The controller 111 determines whether an image capture mode is selected in step S203. The image capture mode can be selected as a camera function is initiated in response to a user input at key input unit 101.

When an image capture mode is selected, the controller 111 displays a preview screen on the display unit 107 in step S205. While displaying the preview screen, the controller 111 recognizes a face in an image of the displayed preview screen in step S207. That is, the face recognition unit 112 of the controller 111 recognizes a face in an image displayed through the preview screen. In order to determine whether a person is in the image of the current preview screen and, if there, to determine the position of the person, the controller 111 recognizes a face in the image shown in the preview screen. This process will be described in detail with reference to FIG. 3A and FIG. 3B.

As shown in FIG. 3A, while displaying the preview screen, the controller 111 determines whether a face appears in the displayed image in step S301. When a face appears in the image, the controller 111 determines whether the number of recognized faces in the image is one or more in step S303.

When the number of recognized faces is one, the controller 111 detects the outline of the person in the whole screen in step S305. Detecting the outline of the person is a process where the controller 111 determines what portion of the recognized face size occupies the whole screen. The controller 111 determines whether an image, displayed in a preview screen on the display unit 107, includes only a face, the whole body, or the upper body.

When recognizing that the image substantially includes only a face during the detection of the person's outline in step S307, the controller 111 detects the coordinates of the features in the recognized face, the coordinates of pupils, the angle of the face, and the coordinates of a body in step S309. When only one face is recognized, an image including only the face is displayed on a preview screen, as shown FIG. 4A.

Figure 4A:
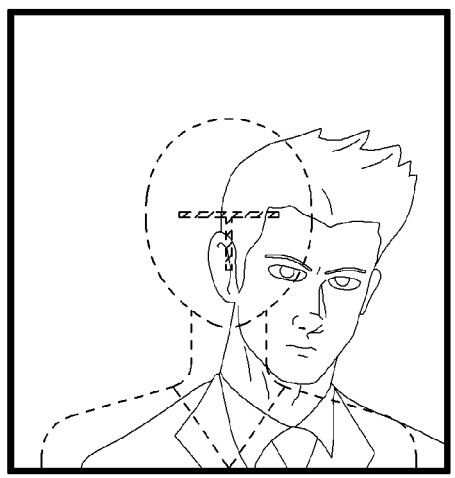
FIG. 4A to FIG. 4E are views illustrating screens of a terminal with an image capture function according to an exemplary embodiment of the present invention.

As shown in FIG. 4A, when the controller 111 determines that one face is displayed in a preview screen, it detects the coordinates of features in the face, coordinates of pupils, angle of face, and coordinates of a body. The features in the face refer to the eyes, a nose, a mouth and the like. The controller 111 detects the above described items to determine where the person in the current preview screen is positioned. The controller 111 detects the coordinates of the eyes, nose, and mouth so that these features face forward, and also detects the coordinates of the pupils. Also, the controller 111 detects the angle of the face in the screen so that it is not tilted to one side, and detects the coordinates of the person to determine the position of the person. Here, it should be understood that the controller 111 can detect not only the coordinates of a face, as described above, but also various other portions of a person.

When the controller recognizes the whole body in step S311, during the detection of a person's outline at step S305, it detects the coordinates of the person's body corresponding to the recognized face in step S313. When the coordinates of a body are detected, the controller 111 can recognize the position of the person in the preview screen. Here, unlike in step S309, only the coordinates of a body are detected in the image in order to show the face and whole body. To this end, the controller 111 can provide a capture guide. However, it is understood that the present invention is not limited to detect only the coordinates of a body, but instead can also be implemented to detect various coordinates as described with respect to step S309.

When the controller 111 recognizes the upper body in step S315, during the detection of a person's outline in step S305, it detects coordinates or features in the recognized face, angle of the face, and coordinate of the person in step S317. Here, unlike step S309, the coordinates of pupils are not detected because the face is too small to enable their detection in the upper body image. However, it is understood that the present invention is not limited to detect only the coordinates of a body but instead exemplary embodiments of the present invention can be implemented to detect various coordinates as described with respect to step S309.

As shown in FIG. 3B, when the controller 111 recognizes a plurality of faces in the image in step S303, it recognizes the sizes of the recognized faces in step S331. The controller 111 determines whether there are faces greater than a preset size among the recognized faces in step S333. Here, the preset size may be a face size in an image including only a face as described with respect to step S307, or a face size in an image including the upper body as described with respect to step S315.

When there is no face greater than the preset size at step S333, the controller 111 detects the coordinates of the bodies associated with the recognized faces in step S337. That is, in this case, the face size is small relative to the whole screen, and accordingly this image may be an image that includes the whole body. The controller 111 detects the coordinates of bodies of recognized faces displayed in the screen.

When there are faces greater than the preset size at step S333, the controller 111 detects the coordinates of features in the faces greater than the preset size, coordinates of pupils, angles of faces, coordinates of the bodies, and coordinates of the bodies belonging to the faces of other sizes in step S335. That is, the controller 111 detects detailed coordinates of the bodies belonging to faces greater than the preset size, and coordinates of the bodies belonging to faces other than the faces that are greater than the preset size. When a plurality of faces are recognized, an image including the faces that are greater than the preset size is displayed on a preview screen, as shown in FIG. 4B to FIG. 4E.

As shown FIG. 4B to FIG. 4E, when the controller 111 determines that a plurality of faces are displayed on a preview screen, it determines whether faces greater than the preset size are in the image. After that, the controller 111 detects detailed coordinates of the bodies belonging to the faces that are greater than the preset size and coordinates of bodies belonging to the other faces in the image. It should be understood that the controller 111 detects not only the coordinates of the face described above but also a variety of other items.

Referring to FIG. 2 again, after recognizing the faces through the steps illustrated in FIG. 3A and FIG. 3B, the controller 111 overlays a capture guide on the displayed preview screen in step S209. When the controller 111 recognizes one face and thus recognizes that an image includes only a face in step S309, as shown in FIG. 4A, it detects the coordinates of the face and overlays the capture guide on the preview screen. For example, the controller 111 recognizes that an image displayed on the preview screen is intended to be captured as a type of photograph for photo-identification, and overlays a capture guide for photo identification on the preview screen. That is, the controller 111 provides a capture guide so that the eyes, nose, and mouth of the person face forward, the pupils face forward, the face is not tilted, and the person is in the center.

Figure 4B:
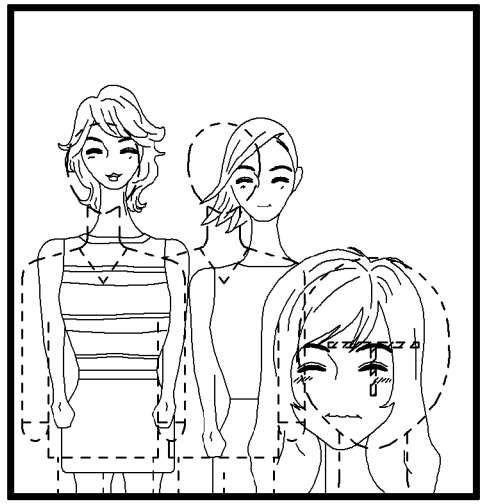
Figure 4C:
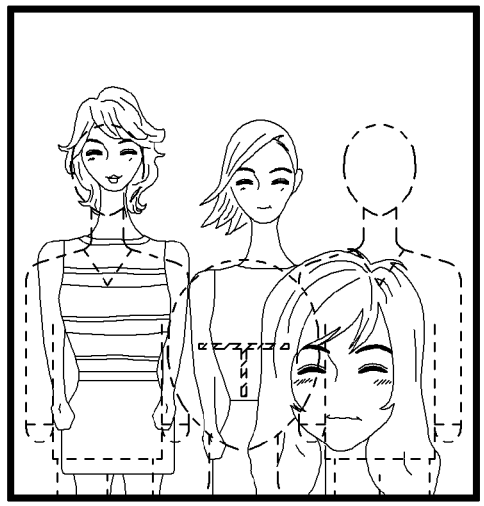

As shown in FIG. 4B and FIG. 4C, when the controller 111 recognizes a plurality of faces in step S335 and recognizes an image that includes only faces or whole bodies, it detects the coordinates corresponding to the recognized objects and overlays a capture guide on the preview screen. FIG. 4B and FIG. 4C show an example where different capture guides are displayed on the same preview screen. In particular, when one person with a face greater than the preset size and two other person's whole bodies are displayed on the preview screen, the controller 111 detects the coordinates corresponding to the respective persons and displays a corresponding capture guide. That is, although the preview screen displays the same image, a variety of capture guides may be displayed thereon. These various capture guides include template types of information regarding the number, position, and size of persons to be captured, and their various preset poses. The capture guides can be displayed in a variety of different ways according to the image recognized by the controller 111.

The capture guide storage unit 110 includes similar capture guides that allow for a plurality of different options, such as positions, poses, etc., to be selected for the same number of persons. The controller 111 provides a representative capture guide of the plurality of similar capture guides. The capture guide can be selected from the provided similar capture guides by keys of the key input unit 101. For example, regarding the same number and position of the persons, a capture guide allowing for different poses can be provided. Also, regarding the same number of persons, the user can select a capture guide located at a particular position.

Figure 4D:
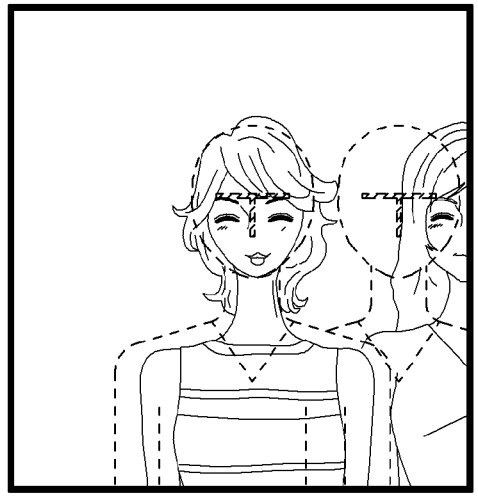
Figure 4E:
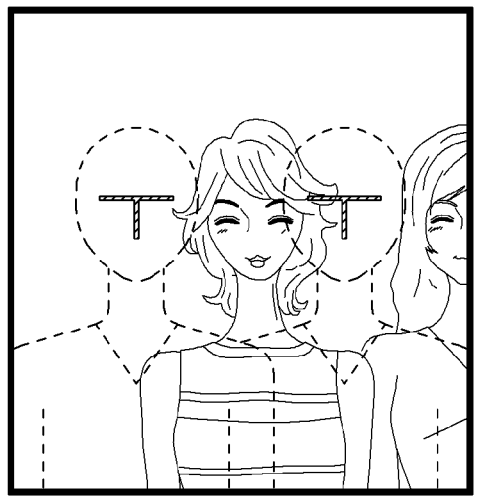

As shown in FIG. 4D and FIG. 4E, when the controller 111 recognizes a plurality of faces at step S335 and recognizes an image that includes the upper body, it detects the coordinates corresponding to the recognized objects and overlays a capture guide on the preview screen. That is, when two persons' upper bodies are displayed on the preview screen, the controller 111 detects the coordinates corresponding to the respective persons and displays a corresponding capture guide.

After that, the controller 111 determines whether persons are arranged to meet the capture guide in step S211. The controller 111 determines whether the terminal is set to an automatic capture mode in step S213. The automatic capture mode can be set by a user when an image capture mode is selected. The exemplary embodiment is implemented in such a way that the automatic capture mode can be automatically set when an image capture mode is selected. The controller 111 performs an automatic capturing operation while the automatic capture mode is set in step S225.

On the contrary, when the automatic capture mode is not set in step S213, the notifying unit 113 of the controller 111 notifies a user that persons are arranged to meet the capture guide in step S215. The notifying unit 113 displays a pop-up window on the display unit 107, turns on/off a lighting device such as an LED, or generates a sound. After that, the controller 111 determines whether a user has taken a photograph in step S217 and the controller 111 performs a capturing operation in step S218.

When the capturing operation is automatically performed through step S225 or manually performed through step S217, the controller 111 inquires whether the captured image will be stored in step S219. When the response to the inquiry is positive, the captured image is stored in step S221. After that, the controller 111 determines whether the present procedure is terminated in step S223. When the response to the inquiry is positive, the controller 111 ends the present procedure, and when negative, the controller 111 returns the procedure to step S205. On the contrary, when the inquiry as to whether the capture image will be stored at step S219 is negative, corresponding functions are performed.

In the first exemplary embodiment of the terminal with an image capture function and the image capturing method, a capturing operation is performed in such a way as to recognize and capture faces through a preview screen, overlaying a capture guide on the preview screen. Therefore, the first exemplary embodiment can obtain an image where persons are properly arranged and enhance the convenience of the device.

Exemplary Embodiment 2

In the following description, the explanation of elements that are similar to or correspond to those in Exemplary Embodiment 1 will be omitted.

The terminal and the image capturing method of Exemplary Embodiment 2 is similar to Exemplary Embodiment 1. However, Exemplary Embodiment 2 includes a feature in that a capture guide is first selected when an image capture mode is selected, and then an image is captured according to the selected capture guide.

Referring to FIG. 1, the key input unit 101 serves to select a capture guide mode for an image capture mode and a particular capture guide, etc. For example, the key input unit 101 selects the number of persons to be captured, and selects one of the capture guides for a variety of arrangements or positions of persons, according to the selected number of persons. In order to change the poses of persons according to the selected capture guide, the key input unit 101 can additionally select a capture guide. Therefore, the user directs and arranges the persons and poses and takes a photograph, according to the capture guide.

The display unit 107 overlays a particular capture guide, selected when the camera 103 is operated, on the preview screen. The display unit 107 displays an image to be captured on the preview screen on which the capture guide is currently displayed.

The controller 111 determines whether a capture guide mode is selected in the image capture mode. When the capture guide mode is selected, the controller 111 overlays a capture guide selected by the key input unit 101 on the preview screen of the display unit 107. When persons are arranged in the preview screen, on which the capture guide is displayed, to substantially correspond to the capture guide, the controller 111 notifies, through the notifying unit 113, that the persons are properly arranged or automatically captures the image.

In the following description, the image capturing method of the terminal according to an exemplary embodiment of the present invention is explained with reference to the drawings.

Figure 5:
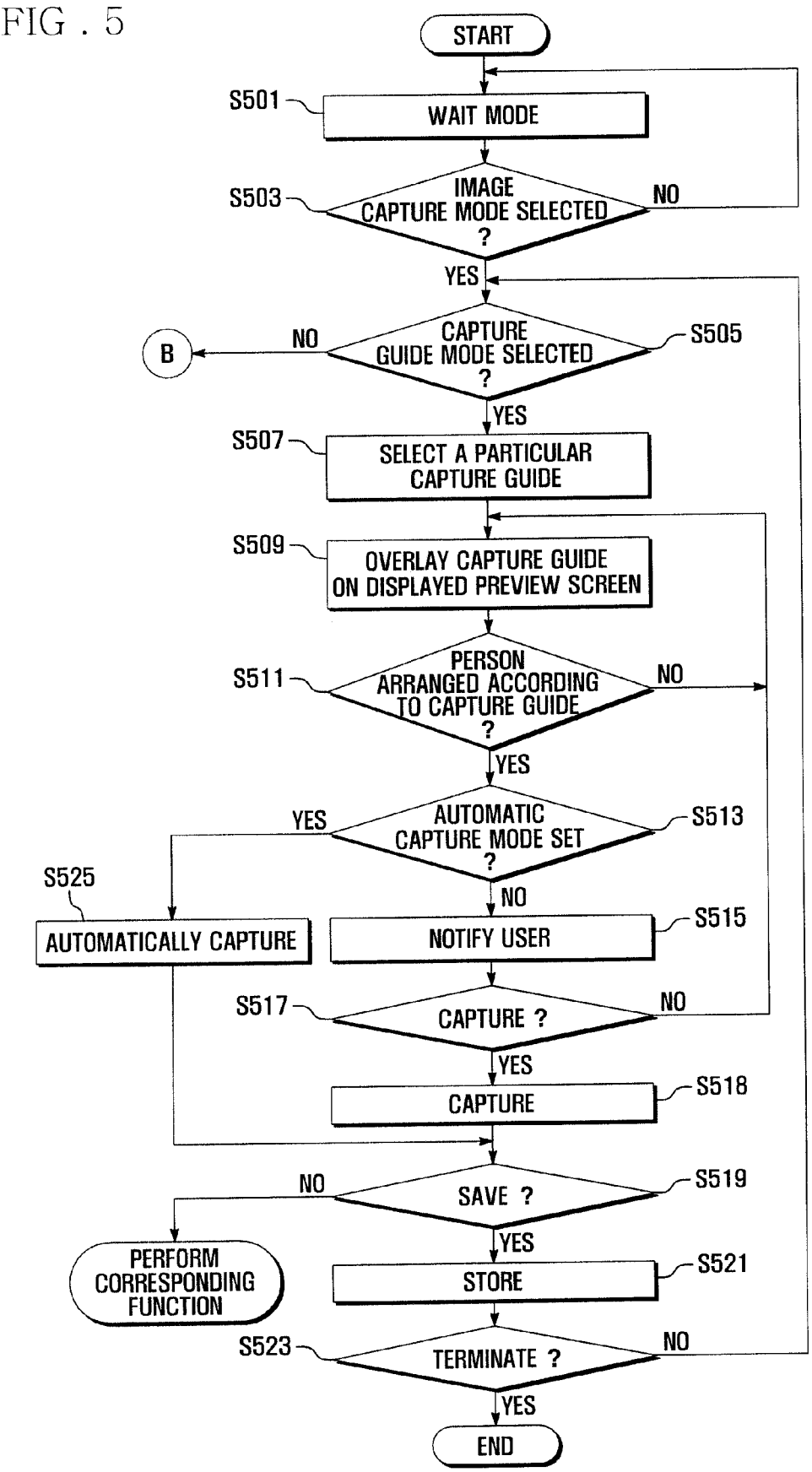
FIG. 5 is a flowchart describing an image capturing method according to an second exemplary embodiment of the present invention.

FIG. 5 is a flowchart illustrating an image capturing method according to a second exemplary embodiment of the present invention.

Referring to FIG. 1, as illustrated in FIG. 5, the controller 111 recognizes a wait mode in step S501.

The controller 111 determines whether an image capture mode is selected in step S503. When the image capture mode is selected, the controller 111 determines whether a capture guide mode is selected in step S505. The controller 111 recognizes that the capture guide mode is selected as a user operates the key input unit 101 in the image capture mode.

When the capture guide mode is selected, the controller 111 recognizes that a particular capture guide is selected through the key input unit 101 in step S507. A user selects a particular capture guide provided in a capture guide mode to capture an image.

After that, the controller 111 overlays the selected capture guide on the preview screen in step S509. The controller 111 determines whether people are arranged to meet the capture guide in step S511. The user selects his/her desired capture guide and displays it on the preview screen, so that the user can capture an image according to the displayed capture guide.

When the controller 111 concludes that people are arranged to meet the selected capture guide, it determines whether an automatic capture mode is set in step S513. When an automatic capture mode is set in step S513, the controller 111 automatically performs a capturing operation in step S525.

On the contrary, when an automatic capture mode is not set, the notifying unit 113 of the controller 111 notifies the user that people are arranged to meet the capture guide in step S515. The controller 111 determines whether the user takes a photograph in step S517 and the controller 111 performs a capturing operation in step S518.

When the capturing operation is automatically performed through step S525 or manually performed through step S517, the controller 111 inquires whether the captured image will be stored in step S519. When the inquiry as to whether the capture image will be stored is positive, the captured image is stored in step S521. After that, the controller 111 determines whether the present procedure is terminated in step S523. When the response to the inquiry as to whether the present procedure is terminated is positive, the controller 111 ends the present procedure, and when the response to the inquiry is negative, the controller 111 returns the procedure to step S505. On the contrary, when the response to the inquiry as to whether the capture image will be stored in step S519 is negative, corresponding functions are performed.

In the second exemplary embodiment of the terminal with an image capture function and the image capturing method, a capturing operation is performed in such a way as to select a particular capture guide in a capture mode, overlay it on the preview, and capture an image. Therefore, the second exemplary embodiment can obtain an image where persons are properly arranged and enhance the convenience of the device.

Exemplary Embodiment 3

In the following description, the explanation of elements that are similar to or correspond to those of Exemplary Embodiments 1 and 2 will be omitted.

The terminal and the image capturing method of Exemplary Embodiment 3 is similar to Exemplary Embodiments 1 and 2. However, Exemplary Embodiment 3 has a feature in that a saved image can be edited in such a way as to select the saved image, recognize a face in the selected image, and overlay a capture guide corresponding to the recognized face on an image.

Referring to FIG. 1, the key input unit 101 serves to select saved images and to edit the selected image in a state where a capture guide is overlaid on the selected image.

Exemplary Embodiment 3 of the present invention may be implemented without the camera 103 because it processes images saved in the memory 109. That is, Exemplary Embodiment 3 can use images received from the external devices as well as saved images that were captured by the camera 103.

The display unit 107 displays an image selected by a user. The display unit 107 overlays a capture guide on a particular image currently displayed thereon. Also, the display unit 107 displays an image edited according to the capture guide.

The memory 109 saves images and capture guides. Also, the memory 109 stores an application program for editing images.

When an image saved in the memory 109 is selected by a user, the controller 111 determines whether a capture guide is selected. When the controller 111 recognizes that the capture guide is selected, it recognizes a face from the selected image through the face recognition unit 112 as described in Exemplary Embodiment 1. The controller 111 displays a capture guide according to the recognized face on the display unit 107.

The controller 111 includes an edit unit 114. When a capture guide is overlaid on a selected image, the edit unit 114 edits the selected image. The edit unit 114 serves to cut/magnify/reduce an image selected according to a capture guide, to cut/magnify/reduce a particular portion of an image, and to cancel the edit execution.

In addition, the controller 111 saves images, edited by the edit unit 114, in the memory 109. The controller 111 overwrites the edited image on the images previously saved in the memory 109.

In the following description, the image capturing method of the terminal according to an exemplary embodiment of the present invention is explained with reference to the drawings.

Figure 6:
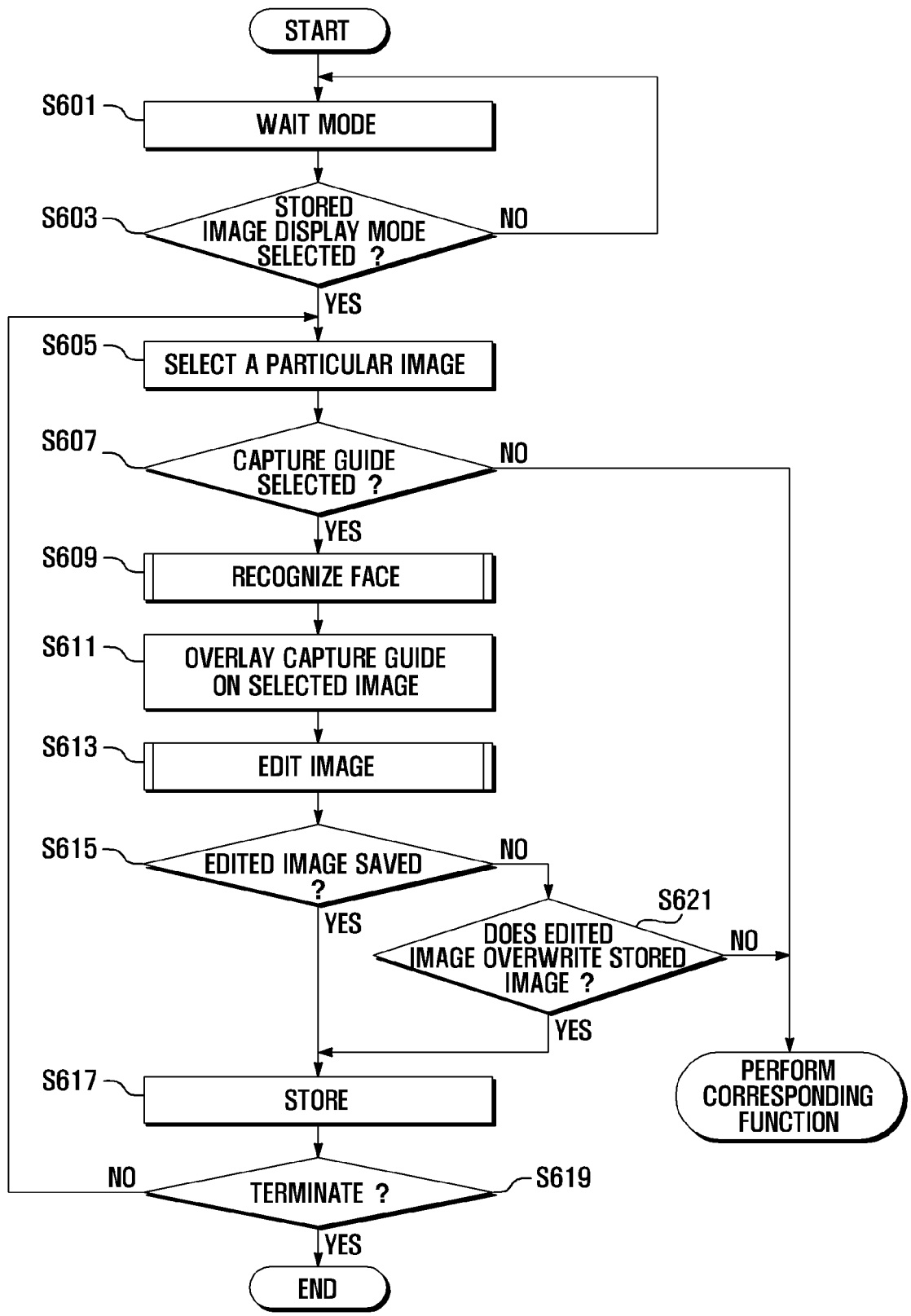
FIG. 6 is a flowchart describing an image capturing method according to a third exemplary embodiment of the present invention.

FIG. 6 is a flowchart describing an image capturing method according to a third exemplary embodiment of the present invention.

Referring to FIG. 1, as shown in FIG. 6, the controller 111 recognizes a wait mode in step S601.

The controller 111 determines whether a mode for displaying saved images is selected in step S603. When the mode for displaying saved images is selected, the controller 111 recognizes that a particular one of the images saved in the memory 109 is selected through the key input unit 101 in step S605.

Next, the controller 111 determines whether a capture guide is selected in step S607. When the capture guide is selected, the face recognition unit 112 of the controller 111 recognizes a face in the selected image, as described in Exemplary Embodiment 1, in step S609. That is, the face recognition unit 112 recognizes a face in an image displayed in the preview screen as in Exemplary Embodiment 1. However, in Exemplary Embodiment 3, the image displayed in the preview screen originates from a saved image.

After that, the controller 111 overlays a capture guide on the selected image in step S611. That is, the controller 111 overlays a capture according to the face recognized in step S609 on the image selected in step S605. For example, when the image selected in step S605 includes only one face, the face recognition unit 112 of controller 111 recognizes the face and detects the coordinates of features in the face, coordinates of pupils, angle of the face, and coordinate of the body associated with the face. The controller 111 overlays a proper capture guide on the selected image, according to detected items.

Afterwards, the edit unit 114 edits the image on which the capture guide is overlaid in step S613. When the capture guide is overlaid, in step S611, on the image selected in step S605, the edit unit 114 edits the selected image. The edit unit 114 cuts, magnifies, or reduces the image selected according to the capture guide. Also, the edit unit 114 cuts, magnifies, or reduces a particular portion of the selected image. In addition, the edit unit 114 cancels its edit execution.

Next, the controller 111 determines whether the edited image is saved in step S615. When the controller 111 detects that a signal for terminating an image edit function is input from the user, it determines whether the edited image is saved.

When the controller 111 detects a signal for saving an edited image in S615, it saves the edited image in the memory in step S617. On the contrary, when the controller does detect a signal for saving an edited image in S615, it determines whether the edited image is overwritten on the saved image in step S621. That is, the controller 111 determines whether the image edited in step S613 is saved in the memory 109, instead of the image that is selected in step S605 and saved in the memory 109.

When the controller 111 detects a signal that allows for overwriting an edited image on the saved image in step S621, it overwrites the edited image on the saved image in step S617. After that, the controller 111 determines whether to terminate the present function in step S619. When this inquiry as to whether the present function is terminated is positive, the controller 111 ends the present procedure, and when the inquiry is negative, the controller 111 returns the procedure to step S605. On the contrary, when the controller 111 does not detect a signal that allows for overwriting an edited image on the saved image in step S621, corresponding functions are performed.

In the third exemplary embodiment of the terminal with an image capture function and the image capturing method, saved images can be edited using a particular capture guide. Therefore, the third exemplary embodiment can obtain an image where persons are properly arranged and enhance the convenience of the device.

As described above, a terminal with an image capture function and an image capturing method thereof, according to exemplary embodiments of the present invention, can capture an image, overlay a capture guide according to a recognized face on a preview screen, capture an image, select a particular capture guide and overlay the particular capture guide on the preview screen, during the capture mode, and edit saved images according to a particular capture guide, thereby obtaining an image where persons are properly arranged and enhancing the convenience of the device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image capturing method of a terminal, the method comprising:
    detecting a plurality of faces in an image displayed on a preview screen in a capture mode;
    overlaying a capture guide selected among a plurality of preset capture guides, the plurality of preset capture guides being generated based on location information of a plurality of faces;
    determining whether the detected faces are arranged to correspond to the capture guide; and
    capturing the image when the detected faces are arranged to correspond to the capture guide.

2. The method of claim 1, further comprising:
    determining whether the plurality of faces in the image comprises a face greater than a preset size; and
    detecting, when there is the face greater than the preset size, coordinates of the face greater than the preset size and coordinates of other faces in the plurality of faces than the face greater than the preset size.

3. The method of claim 2, wherein the coordinates of the face that is greater than the preset size comprise at least one of coordinates of features in the face that is greater than the preset size, coordinates of pupils in the face greater than the preset size, an angle of the face greater than the preset size, and coordinates of a person with the face greater than the preset size.

4. The method of claim 2, wherein the detecting of the coordinates of the face greater than the preset size further comprises detecting coordinates of bodies associated with the other faces of the plurality of faces when there is no face greater than the preset size.

5. The method of claim 1, wherein the overlaying of the capture guide on the preview screen comprises:
    storing respective preset template types of information for a number, a position, a size of persons to be captured and a variety of capture poses of the persons to be captured;
    storing groups of a plurality of capture guides, each group of the plurality of capture guides comprising capture guides for a same number of persons, wherein each capture guide of the group of the plurality of capture guides is for at least one of positions and poses; and
    providing a representative capture guide of each of the groups of the plurality of capture guides.

6. The method of claim 1, wherein the capture guide is generated based on at least one of a number, a position, and a size of faces of persons to be captured and a variety of capture poses of the persons to be captured.

7. An image capturing method of a terminal, the method comprising:
    determining, when saved images are selected, whether a capture guide is selected;
    recognizing, when the capture guide is selected, a face in the selected image;
    overlaying the capture guide on the image according to the recognized face; and
    editing the image,
    wherein the recognizing of the face comprises:
        determining, when the face appears in the image, whether there is one or a plurality of faces in the image;
        detecting, when one face appears in the image, an outline of a person associated with the face in the image; and
        detecting coordinates of the face, when detecting the outline of the person, if one face is determined to be in the image, and
    wherein the detecting of the outline of the person comprises:
        determining, when there is a plurality of faces in the image, whether there is a face greater than a preset size; and
        detecting, when there is a face greater than the preset size, coordinates of the face greater than the preset size and coordinates of faces other than the face that is greater than the preset size.

8. The method of claim 7, wherein the detecting of the coordinates of the face further comprises detecting, when there is no face greater than the preset size, coordinates of bodies associated with the plurality of faces.

9. A terminal comprising:
a camera for capturing an image;
a face recognition unit for detecting a plurality of faces in the image;
a memory for storing the image and a plurality of predetermined capture guides comprising location information of the plurality of faces according to the detected plurality of faces; and
a controller for overlaying a capture guide selected among the plurality of predetermined capture guides, the predetermined plurality of capture guides being generated based on location information of a plurality of faces, for determining whether the detected plurality of faces are arranged to correspond to the capture guide, and for capturing the image when the detected plurality of faces are arranged to correspond to the capture guide.

10. The terminal of claim 9, wherein the face recognition unit determines whether there is a face greater than a preset size in the image, and, when there is the face greater than the preset size, detects coordinates of the face greater than the preset size and coordinates of faces other than the face greater than the preset size.

11. The terminal of claim 9, wherein:
the controller recognizes an image saved in the memory when the saved image is selected and the capture guide is selected, and overlays the capture guide on the image according to the recognized face; and
the controller further comprises an edit unit for editing the image.

12. The terminal of claim 9, wherein the capture guide is generated based on at least one of a number, a position, and a size of faces of persons to be captured and a variety of capture poses of the persons to be captured.

* * * * *